R. J. CROACHER.
Improvement in Reamers.
No. 130,488. Patented Aug. 13, 1872.
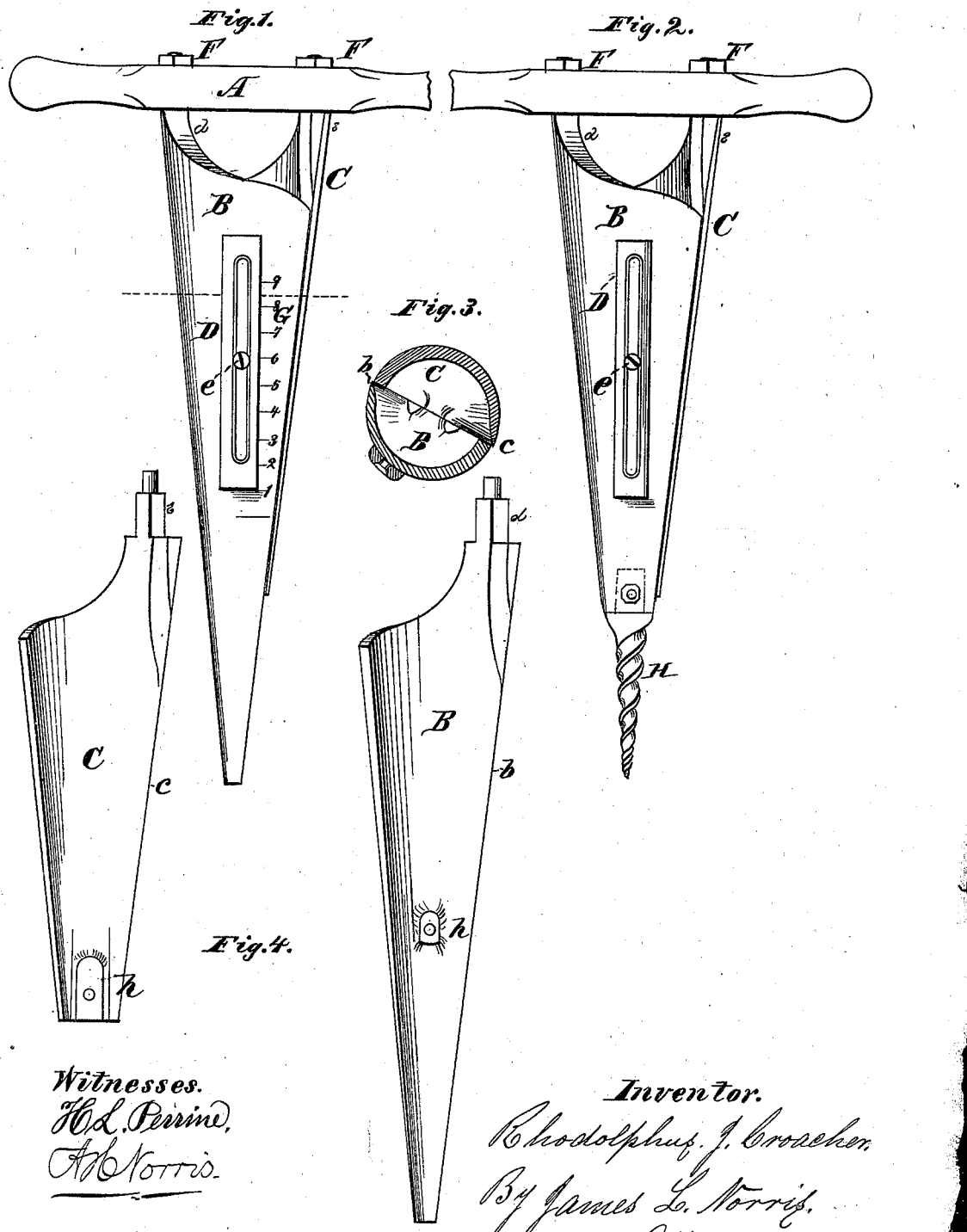

UNITED STATES PATENT OFFICE.

RHODOLPHUS J. CROACHER, OF LITTLE COMPTON, RHODE ISLAND.

IMPROVEMENT IN REAMERS.

Specification forming part of Letters Patent No. 130,488, dated August 13, 1872.

*To all whom it may concern:*

Be it known that I, RHODOLPHUS J. CROACHER, of Little Compton, in the county of Newport and State of Rhode Island, have invented a new and useful Improvement in Reamers, of which the following is a specification:

This invention relates to that class of instruments known as "reamers," used for reaming out bung-holes, wheel-hubs, &c.; and it consists in the combination of two hollow cone-shaped blades, each formed with a cutting-edge, whereby double cutting-edges, opposite each other, are obtained when the said blades are brought together, each of the said blades also being formed with a shank on line with its cutting-edge, so that when the same are adjusted and attached to a handle strength and steadiness are secured at the desired point.

In the accompanying drawing, Figure 1 is a perspective view of my improved reamer. Fig. 2 is a perspective view of reamer with auger-bit attached. Fig. 3 is a transverse view of the blade. Fig. 4 shows the blades detached.

The reamer is made of steel, in two parts, each part provided with a cutting-edge. A is the handle, to which the blades B and C of the reamer are fastened by nuts F in the usual manner. The blades are of the hollow half-cone form common to reamers, but are each formed with its own shoulder and shank $d\ e$, for attachment to the handle in line with the cutting-edges, whereby strength and steadiness are secured at the desired part. The blade C is truncated, as shown in Fig. 3, while B tapers to a point, projecting beyond C. This is the form of the two blades when employed without the auger. The blades B and C have each a beveled cutting-edge, lettered, respectively, $b$ and $c$. Near the extremity of blade C, and at or about a corresponding point on blade D, and within their concavities, are formed abutments or projections $h$, provided with a thread, and acting as a nut for the reception of the bolt which passes through blade B, firmly uniting the reamer in its length.

When the two blades are united the cutting-edges project at opposite sides of the hollow cone, formed as will be seen by reference to Fig. 3. As a transverse section of the blades, when united, would present nearly a true circle, it follows that the hole cut must be round.

D is a slotted sliding bar, attached to and adjustable upon blade B by means of thumb-screw $e$. G is a scale or gage, marked longitudinally upon the blade B of the reamer, denoting the diameter of the cone at different points.

In order to regulate or determine the size of the hole made, all that will be required is to slide the slotted bar up or down until its lower extremity rests opposite the desired mark, when it can be fixed at that point by tightening the thumb-screw. If it is found to be desirable the scale can be engraved upon the sliding bar D, in which case it would be graded inversely and the thumb-screw considered as the fixed point.

When the auger or bit marked H is to be used with the reamer, and to form a part thereof, both blades are made like the blade marked C in Fig. 3, except that they are truncated at a point nearer the apex of the cone, and the lower extremity of the reamer is provided with a suitable socket for the reception of the shank of the auger. The shank of the auger should have a shoulder corresponding in diameter to the diameter of the reamer at their point of union.

Having thus described my invention, what I claim as new, and desire to secure by Letters Patent, is—

1. The two hollow cone-shaped blades B C, each formed with a cutting-edge, and with a shank, in one piece and in line with each other, and connected with the handle A, the cutting-edges being opposite each other, as herein shown and set forth.

2. The improved reamer, consisting of the two hollow cone-shaped blades B C, each provided with a cutting-edge, $b\ c$, and with a shank, $d\ e$, for connection with the handle A, said blades being provided with abutments $h$ within their concavities, having screw-threaded openings therein to receive the bolt which connects the said blades together, as herein shown and described.

To the above I have signed my name this 12th day of March, A. D. 1872.

RHODOLPHUS J. CROACHER.

Witnesses:
  HENRY M. TOMPKINS,
  ANNA. B. TOMPKINS.